United States Patent
Pompei

(10) Patent No.: US 6,299,347 B1
(45) Date of Patent: *Oct. 9, 2001

(54) AMBIENT AND PERFUSION NORMALIZED TEMPERATURE DETECTOR

(75) Inventor: Francesco Pompei, Boston, MA (US)

(73) Assignee: Exergen Corporation, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/564,403

(22) Filed: May 1, 2000

Related U.S. Application Data

(63) Continuation of application No. 08/881,891, filed on Jun. 24, 1997, now Pat. No. 6,056,435.

(51) Int. Cl.⁷ .................................................. G01J 5/02
(52) U.S. Cl. ........................... 374/133; 702/131; 600/549
(58) Field of Search .................................. 374/133, 179, 374/128; 600/549, 474; 702/131

(56) References Cited

U.S. PATENT DOCUMENTS

| | | | |
|---|---|---|---|
| Re. 34,789 | 11/1994 | Fraden | 702/104 |
| 4,784,149 | 11/1988 | Berman et al. | 600/474 |
| 4,846,583 | 7/1989 | Yamamoto | 374/163 |
| 4,993,419 | 2/1991 | Pompei et al. | 600/474 |
| 5,024,533 | 6/1991 | Egawa et al. | 374/126 |
| 5,150,969 | 9/1992 | Goldberg et al. | 374/128 |
| 5,167,235 | 12/1992 | Seacord et al. | 600/474 |
| 5,232,284 | 8/1993 | Egawa et al. | 374/126 |
| 5,271,407 | 12/1993 | Pompei et al. | 600/474 |
| 5,333,784 | 8/1994 | Pompei | 236/91 C |
| 5,381,796 | 1/1995 | Pompei | 600/549 |
| 5,445,158 | 8/1995 | Pompei | 600/474 |
| 5,653,238 | 8/1997 | Pompei | 600/474 |
| 5,743,644 * | 4/1998 | Kobayashi et al. | 374/128 |
| 5,874,736 | 2/1999 | Pompei | 250/338.1 |

FOREIGN PATENT DOCUMENTS

| | | |
|---|---|---|
| 0 446 788 A1 | 9/1991 | (EP) . |
| 0 763 349 A2 | 3/1997 | (EP) . |

* cited by examiner

Primary Examiner—Diego Gutierrez
Assistant Examiner—Stanley J. Pruchnic, Jr.
(74) Attorney, Agent, or Firm—Hamilton, Brook, Smith & Reynolds, P.C.

(57) ABSTRACT

A body temperature detector is particularly suited to axillary temperature measurements of adults. The radiation sensor views a target surface area of the body and electronics compute an internal temperature of the body as a function of ambient temperature and sensed surface temperature. The function includes a weighted difference of surface temperature and ambient temperature, the weighting being varied with target temperature to account for varying perfusion rate. Preferably, the coefficient varies from a normal of about 0.13 through a range to include 0.09. The ambient temperature used in the function is assumed at about 80° F. but modified with detector temperature weighted by 20%.

1 Claim, 3 Drawing Sheets

AMBIENT AND PERFUSION NORMALIZED TEMPERATURE DETECTOR

RELATED APPLICATION(S)

This application is a Continuation of 08/881,891 filed Jun. 24, 1997, (now U.S. Pat. No. 6,056,435) the entire teachings of which are incorporated herein by reference.

BACKGROUND OF THE INVENTION

In recent years, infrared thermometers have come into wide use for detection of temperature of adults. For core temperature readings, infrared thermometers which are adapted to be inserted into the patient's ear have been extremely successful. Early infrared thermometers were adapted to extend into the ear canal in order to view the tympanic membrane and provide an uncorrected, direct reading of tympanic temperature which correlates with pulmonary artery temperature. More recently, however, to provide for greater comfort and ease of use, ear thermometers have been designed to provide corrected readings of the generally cooler distal ear canal. Such thermometers measure temperature of distal ear canal tissue and calculate arterial temperature via heat balance.

The arterial heat balance approach is based on a model of heat flow through series thermal resistances from the arterial core temperature to the ear skin temperature and from the ear skin temperature to ambient temperature. Accordingly, after sensing both the skin temperature and ambient temperature, the arterial core temperature can be calculated. The thermal resistance model also allows for computation of equivalent oral and rectal temperatures with the mere adjustment of a weighting factor in the computation.

Infrared ear thermometry has not found such high acceptance for use with neonates. Neonates have a very high moisture level in their ear canals, due to the presence of vernix and residual amniotic fluid, resulting in low ear temperatures because of the associative evaporative cooling. In addition, environmental uncertainties, such as radiant heaters and warming pads can significantly influence the air temperature. Further, clinicians are less inclined to position the tip of an infrared thermometer in the ear of a small neonate.

Infrared thermometers designed for axillary temperature measurements are presented in U.S. patent applications Ser. Nos. 08/469,484 (now U.S. Pat. No. 5,893,833) and 08/738, 300 (now U.S. Pat. No. 5,874,736) which are incorporated herein by reference in their entirety. In each of those devices, an infrared detector probe extends from a temperature display housing and may easily slide into the axilla to lightly touch the apex of the axilla and provide an accurate infrared temperature reading in as little as one-half second. The axillary thermometer also relies on the arterial heat balance approach to provide arterial, oral or rectal temperature.

The axillary infrared thermometer has found great utility not only with neonates but as a screening tool in general, and especially for small children where conventional temperature measurements such as a thermometer under the tongue or a rectal thermometer are difficult.

SUMMARY OF THE INVENTION

Unfortunately, the accuracy and repeatability of axillary infrared thermometry with neonates has not extended to older patients. The present invention relates to improvements to the axillary infrared thermometer based on clinical research to improve the device for older patients.

In neonates perfusion is high, and in both the ear of adults and the axilla of neonates, perfusion rates are relatively constant since vasomotor functions are minimal. However, with older patients perfusion rates in the axilla are more variable.

In ear and neonate axillary thermometry, the difference between skin temperature and ambient temperature has been weighted by a coefficient approximating h/pc, where h is an empirically determined coefficient which includes a radiation view factor between the skin tissue and ambient, p is perfusion rate and c is blood specific heat. In ear and neonate axillary thermometry, that coefficient was found empirically to be about 0.09 and 0.05, respectively, with only minor variations. However, with greater exposure for heat transfer and higher vasomotor functions, that coefficient has been determined empirically for the adult axillary region to be about 0.13 with much more significant variations.

Further, it has been determined that perfusion rate varies according to the patient's temperature. Under febrile (fever) conditions, metabolic demand increases and oxygen consumption increases at a rate greater than that required to sustain a temperature, thereby requiring an increase in perfusion and thus reducing the required weighting coefficient. Under normal, a febrile conditions, normal thermal regulation varies skin temperature over a wider range for skin temperature variation of several degrees with core temperature variation of only a few tenths of a degree.

As in prior ear and axillary thermometers, internal core temperature can be computed from the function $$T_c = (1+(h/pc))(T_s-T_a)+T_a \qquad (1)$$

where $T_s$ and $T_a$ are the skin and ambient temperatures. The function can be seen to include a weighted difference of surface temperature and ambient temperature with a weighting coefficient h/pc.

In accordance with the present invention, a body (i.e., human or animal) temperature detector comprises a radiation sensor which views a target surface area of the body. Electronics in the detector compute an internal temperature of the body as a function of ambient temperature and sensed surface temperature. In accordance with one aspect of the invention, the function includes a weighted difference of surface temperature and ambient temperature, the weighting being varied with target temperature. In particular, the weighting is an approximation of h/pc where h is a heat transfer coefficient between the target surface and ambient, p is perfusion rate and c is blood specific heat.

In a preferred embodiment, the normal approximation of h/pc is about 0.13 for afebrile (nonfever) conditions, and it varies over a range of at least 0.09 to 0.13. Preferably, the approximation of h/pc varies over a range of at least 20% of normal, and the variation with sensed surface temperature is at least 0.01/° F. Preferably, the change of h/pc is about −0.02/° F. at about normal axillary temperature of 97° F.

The preferred approximation of h/pc is an expression that approximates the idealized straight line segments representing normal and febrile conditions combined to form a curve with a smooth transition from one physiological regime to the other. The expression may be an exponential, two straight line segments, a single straight line segment or, preferably, a polynomial.

The arterial heat balance approach is based on a steady state model, and the ambient temperature $T_a$ used in the arterial heat balance function has been taken as the sensed detector temperature. However, thermal equalization of a temperature detector with its measurement environment may take many seconds, so the detector may in fact be cooler or warmer than the ambient environment to which the target skin had been exposed prior to the measurement. Though the detector obtains an accurate skin temperature reading with reference to detector temperature, the detector temperature may not serve as an accurate indication of the steady state ambient temperature which led to that skin temperature.

It has been determined empirically that a more appropriate ambient temperature to be used in the heat balance computation is an assumed temperature of about 80° F. That assumed temperature can be improved by giving some weight to the sensed detector temperature, though significantly less than the 100% weight given in prior heat balance calculations.

Accordingly, in accordance with another aspect of the invention, where the electronics compute an internal temperature of the body as a function of ambient temperature and sensed surface temperature, the ambient temperature within the function is an assumed ambient temperature, the preferred being about 80° F. Preferably, the assumed ambient temperature is modified as a function of sensed detector temperature, a change in assumed ambient temperature relative to change in detector temperature being significantly less than 1. Preferably, that change in assumed ambient temperature relative to change in sensed detector temperature is less than 0.5, and most preferably it is about 0.2. Alternatively, the assumed ambient temperature may be fixed, again preferably at 80° F.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
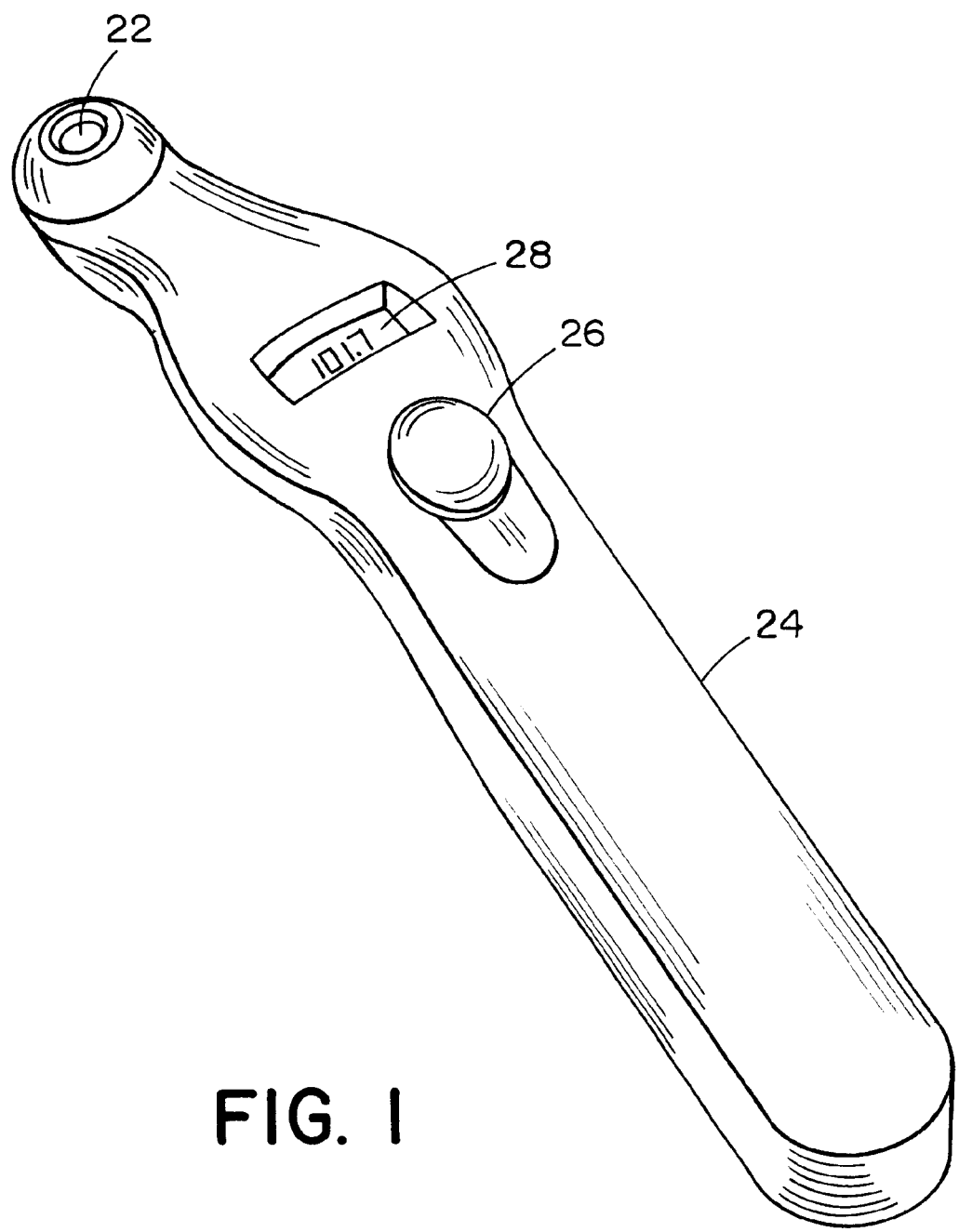
FIG. 1 illustrates an axillary infrared thermometer embodying the present invention.

FIG. 1 illustrates a radiation detector adapted for axillary temperature measurement. As disclosed in greater detail in U.S. patent application Ser. No. 08/738,300 (now U.S. Pat. No. 5,874,736) a radiation detector views a target surface through a window 22. The radiation detector is preferably a thermopile for rapid response, but other radiation detectors may also be used. The detector is adapted to be held by the handle portion 24 with the sensor end inserted into the axilla. Once in position, the button 26 is pressed to begin a measurement. Electronics within the housing then compute sensed skin temperature, and using arterial heat balance equations, compute an internal core temperature for display on the display 28. In typical home applications, the core temperature is displayed as the equivalent oral temperature. Details of the electronics can be found in prior application Ser. No. 08/738,300 (now U.S. Pat. No. 5,874,736) incorporated herein by reference in its entirety.

Figure 2:
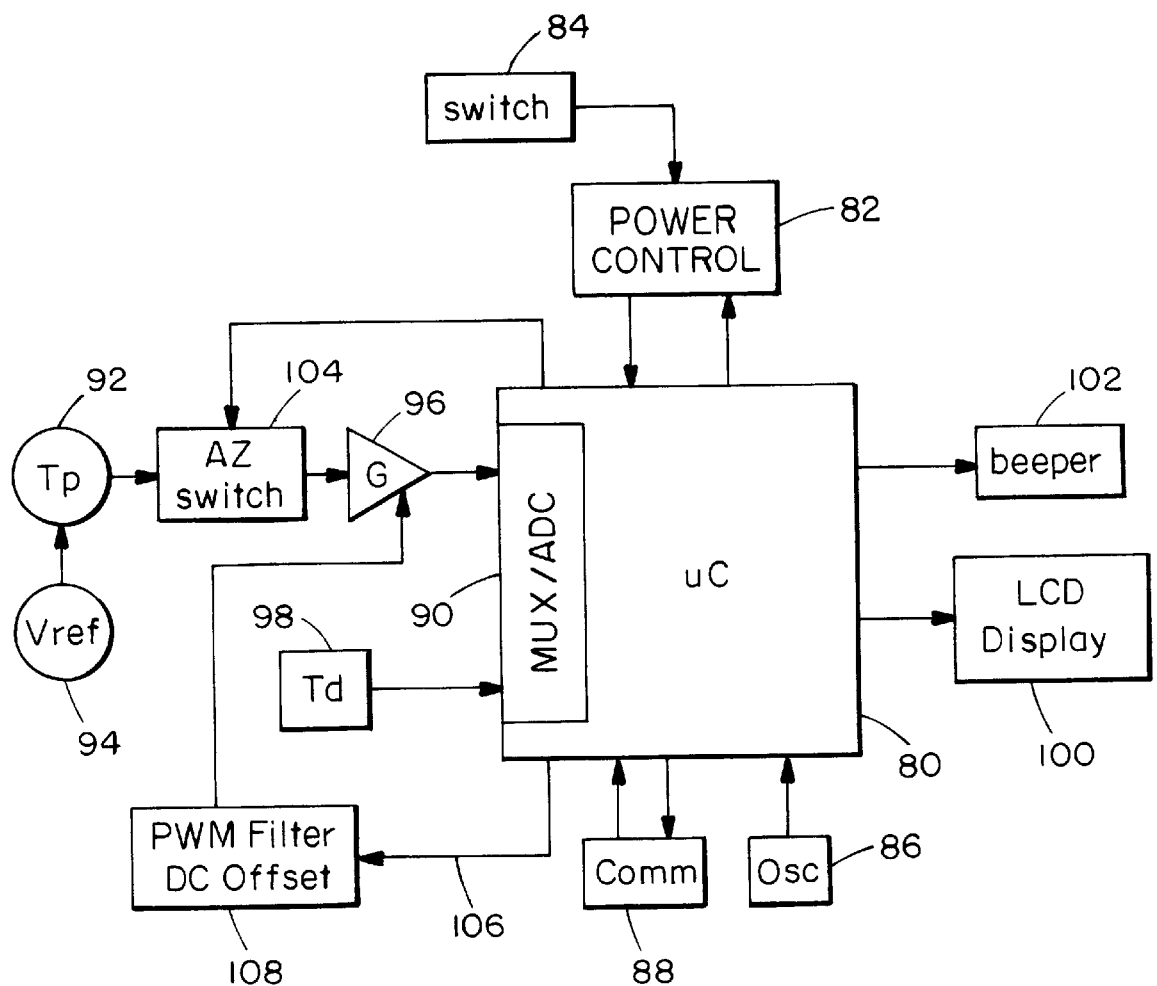
FIG. 2 is an electrical block diagram of the electronics of the thermometer of FIG. 1.

An electrical block diagram for the radiation detector is presented in FIG. 2. A microprocessor 80 is at the heart of the circuit. A power control circuit 82 responds to activation of the button switch 84 by the user to apply power to the microprocessor and other elements of the circuit. That power is maintained until the microprocessor completes the measurement cycle and signals the power control 82 to power down. The microprocessor is clocked by an oscillator circuit 86 and may communicate with an external source for programming and calibration through communication conductors 88. The temperature determined by the microprocessor is displayed on the liquid crystal display 100, and completion of the temperature processing is indicated by a beeper 102. During the measurement process, the microprocessor takes readings through a multiplexer/analog-to-digital converter 90. The preferred microprocessor 80 is a PIC16C74 which includes an internal 8-bit A-D converter. To minimize expense, the circuit is designed to rely solely on that A-D converter.

Thermopile 92 provides a voltage output signal equal to the fourth power difference between target temperature and the temperature of the thermopile cold junction, offset by voltage reference 94. The voltage output from the thermopile is amplified by an amplifier 96, having a gain in the order of 1000, which also provides an offset determined by a pulse width modulated filter 108 controlled by the microprocessor. Through operation of the multiplexer, the microprocessor provides an analog-to-digital conversion of the amplified sensor output and of the detector temperature $T_d$ provided by temperature sensor 98. The temperature sensor 98 is positioned to sense the substantially uniform temperature of the thermopile cold junction, can and heat sink. An auto zero switch 104 is included to allow for isolation of the amplifier 96 from the thermopile 92 during a calibration sequence as discussed in prior application Ser. No. 08/738, 300 (now U.S. Pat. No. 5,874,736).

It is well known that the output of thermopile is proportional to $(T_s^4-T_d^4)$ where $T_s$ is the target skin temperature viewed by the radiation detector and $T_d$ is the temperature of the detector measured by sensor 98. From that relationship, $T_s$ can be computed. It is also known that, based on the determined skin temperature and the ambient temperature to which the skin is exposed, an internal core temperature can be computed using the arterial heat balance approach illustrated in FIG. 3. Heat flux q from the internal core temperature $T_c$ passes through the skin 30 to the ambient environment at temperature $T_a$. The skin is thus held at some intermediate temperature $T_s$.

The heat loss of skin, such as the external ear canal or axilla, to the environment can be calculated with the following well-known equation:

$$q=hA(T_s-T_a) \qquad (2)$$

where q is heat flow, A is surface area, $T_s$ and $T_a$ the skin and ambient temperatures, respectively, and h is an empirically determined coefficient which includes a radiation view factor between the skin tissue and ambient. The equation takes the linear form for simplicity. Although the exact form of the equation is fourth-power due to the radiation exchange, the linearized form provides excellent accuracy over the range of interest of about 90° to 105° F.

Heat flow from the core arterial source to the skin is via blood circulation, which is many times more effective than tissue conduction. Thermal transport via the $$q = wc(T_c - T_s) \quad (3)$$

circulation can be described with the following equation: where q again is heat flow, w is blood mass flow rate, c is blood specific heat, and $T_c$ and $T_s$ are core and skin temperatures, respectively.

Accordingly, the skin can be viewed thermally as tissue being warmed by its blood supply as governed by equation 3, balanced by radiating heat to ambient as governed by equation 2.

Equating:

$$hA(T_s - T_a) = wc(T_c - T_s) \quad (4)$$

Simplifying by dividing by surface area A:

$$h(T_s - T_a) = pc(T_c - T_s) \quad (5)$$

where p is blood flow per unit area, also termed perfusion rate.

Equation 5 then provides a method to calculate core temperature $T_c$ when skin temperature $T_s$ and ambient temperature $T_a$ are known, and the coefficients (or their ratio) have been empirically determined.

$$T_c = (h/pc)(T_s - T_a) + T_s \quad (6)$$

Solving for $T_c$:
where h/pc, the weighting coefficient which weights the difference of surface temperature and ambient temperature, is empirically determined on a statistical basis over a range of patients and clinical situations.

An alternative method of calculating is to employ an electrical analog technique, since equations 2 and 3 have the identical form of a simple voltage/current relationship. The method employs the convention that electrical current is analogous to heat flow and voltage differential is analogous to temperature differential.

$$q = (1/R_1)(T_s - T_a) \quad (7)$$

Figure 3:
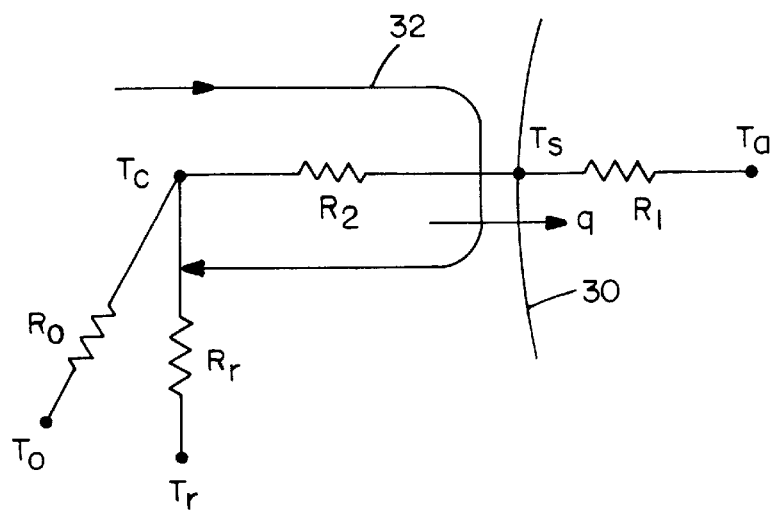
FIG. 3 illustrates the arterial heat balance model.

Accordingly, equations 2 and 3 may be written as:

$$q = (1/R_2)(T_c - T_s) \quad (8)$$

and the electrical circuit can be drawn, with $T_c$ and $T_s$ as constant temperature (voltage) reservoirs (FIG. 3). A third equation with a more convenient form can be written as:

$$q = (1/(R_1 + R_2))(T_c - T_a) \quad (9)$$

Using equations 7 and 9 and solving for $T_c$:

$$T_c = ((R_1 + R_2)/R_1)(T_s - T_a) + T_a \quad (10)$$

$$T_c = k(T_s - T_a) + T_a \quad (11)$$

and finally: which is the precise form of the heat balance equation programmed into arterial heat balance instruments, with $(R_1 + R_2)/R_1$ expressed as the k-Factor.

The k Factor can be rewritten as follows:

$$k = \frac{R_1 + R_2}{R_1} = 1 + \frac{R_2}{R_1} 1 + (h/pc) \quad (12)$$

Accordingly, in either form, equation 6 or 11, it can be seen that the weighting coefficient h/pc is applied to the difference of surface and ambient temperature.

In the weighting coefficient, h is relatively constant and c is a constant. In ear temperature and neonatal axillary temperature measurements, the perfusion rate is also generally constant, resulting in h/pc of about 0.09 for adult ears and 0.05 for neonates. For a normal adult, the perfusion rate of the axilla is such that the weighting coefficient h/pc is about 0.13. Further, the perfusion rate varies according to the condition of the patient. In particular, with a fever, the perfusion rate can become much higher such that h/pc drops below 0.9.

Figure 4:
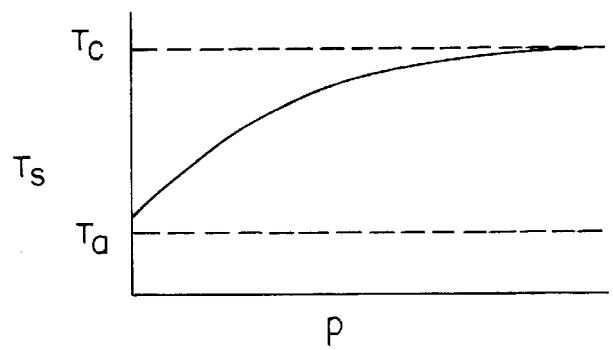
FIG. 4 illustrates change in skin temperature relative to ambient and core temperatures with change in perfusion rate.
Figure 5:
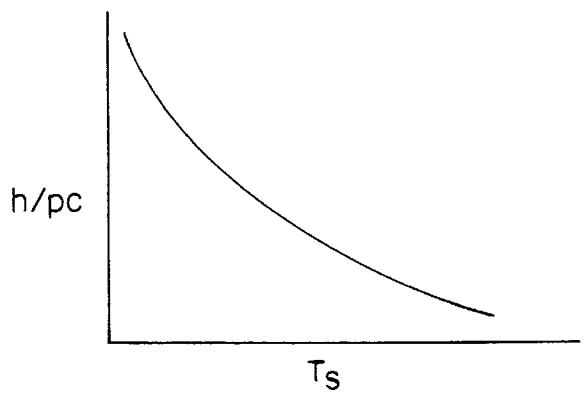
FIG. 5 illustrates the change in weighting coefficient h/pc with change in skin temperature.

FIG. 4 illustrates change in skin temperature with change in perfusion rate as predicted by the heat balance model and empirically. With no perfusion, the resistance $R_2$ is very high such that the skin temperature is close to ambient temperature. With increased perfusion, however, the resistance $R_2$ is reduced, and the skin temperature approaches the core temperature. Generally, the perfusion rate is in the region of FIG. 4 where there is a substantial change in skin temperature with change in perfusion rate. Since $T_s$ varies exponentially with perfusion, the weighting coefficient h/pc can be seen to vary exponentially with skin temperature as illustrated in FIG. 5. From perfusion data presented by Benzinger, T. H., "Heat Regulation: Hemostasis of Central Temperature in Man," *Physl. Rev.*, 49:4, (October 1969), the coefficient h/pc can vary from 0.05 to 3.5.

Since all body site temperatures of interest arise from the arterial temperature source, the arterial heat balance can be applied to any site. Accordingly, based on the Thevenin equivalents theorem, oral and rectal diagnostic equivalents $T_o$ and $T_r$ of arterial temperature can be calculated by appropriate selection of k-Factor, empirically taking into consideration resistances $R_o$ and $R_r$.

Through clinical testing, the following polynominal function is found to provide a close approximation of h/pc with change in skin temperature for both afebrile and febrile ranges:

$$h/pc = 0.001081 T_s^2 - 0.2318 T_s + 12.454$$

where $T_s$ is in °F.

To satisfy processing limitations of the microprocessor, that exponential function maybe replaced with a reasonable linear approximation:

$$h/pc = -0.018259 T_s + 1.9122 \quad (14)$$

With both approximations, the change in (h/pc) relative to change in skin temperature is approximately $-0.02^-$/° F. at normal axillary temperature of about 97° F. With the polynominal approximation the change ranges from $-0.005$/° F. to $-0.03$/° F. Over a design temperature range of 90 to 105° F., the linear approximation results in a range of coefficients h/pc of 0.02 to 0.16 while the polynominal approximation results in a range of 0.04 to 0.25. The most critical portion of that range is considered to be from the normal coefficient value of 0.13 to about 0.09, corresponding to high perfusion rate of the febrile condition. That range presents a change of (0.13–0.09)/0.13=30.8%. A range of at least 20% of the normal coefficient presents significant improvement in accuracy.

Another error in prior core temperature measurements based on adult skin temperature has resulted from the taking of measurements prior to the skin and detector reaching the steady state heat balance on which the arterial heat balance model is based. It has been found that during a short measurement period which is significantly less than the thermal time constant of the measurement environments, the detector temperature is a poor estimate of ambient temperature. In fact, it has been found that, without an accurate ambient temperature measurement, a more appropriate choice for ambient temperature in equation 1 is an assumed temperature of 80°. That assumed temperature can be improved by considering the detector temperature, but rather than having the ambient temperature directly coincide with the sensed detector temperature, only a 20% weighting is given to the detector temperature. Accordingly, a preferred choice of ambient temperature for the heat balance equation is that of $$T_a = \frac{T_d}{5} + 64 \qquad (15)$$

Based on this equation, if the detector is at 80°, the chosen ambient temperature is also 80°. However, as detector temperature moves from 80°, the chosen ambient temperature also moves from 80° but only at 20%. For example, when the detector temperature is 70° F., the chosen ambient temperature is 78° F. The 78° is a more reasonable estimate for the heat balance equation because the skin temperature had been at steady state while viewing an ambient temperature of approximately 80° but is slowly dropping in temperature due to the cooler instrument at 70°.

If the detector were held against the skin until steady state were reached, the sensed detector temperature would then be the most accurate choice of ambient temperature. In that case, any error resulting from the use of equation 15 would be minimal in view of the minimal temperature differential $(T_s-T_a)$.

While this invention has been particularly shown and described with references to preferred embodiments thereof, it will be understood by those skilled in the art that various changes in form and details may be made therein without departing from the scope of the invention encompassed by the appended claims.

What is claimed is:

1. A body temperature detector comprising:

a radiation sensor which views a target surface area of the body; and electronics which compute an internal temperature of the body as a function of a sensed ambient temperature and a sensed surface temperature of the body, the function including a weighted difference of the sensed surface temperature and the sensed ambient temperature, the weighting being varied with sensed temperature.

* * * * *